(12) United States Patent
Penman

(10) Patent No.: US 8,132,839 B2
(45) Date of Patent: Mar. 13, 2012

(54) RECREATIONAL VEHICLE COVER

(76) Inventor: Val Penman, Santa Clara, UT (US)

( * ) Notice: Subject to any disclaimer, the term of this patent is extended or adjusted under 35 U.S.C. 154(b) by 0 days.

(21) Appl. No.: 12/971,254

(22) Filed: Dec. 17, 2010

(65) Prior Publication Data

US 2011/0148138 A1 Jun. 23, 2011

Related U.S. Application Data

(60) Provisional application No. 61/284,505, filed on Dec. 17, 2009.

(51) Int. Cl.
*B60J 11/00* (2006.01)

(52) U.S. Cl. ......... 296/100.04; 296/136.01; 296/136.13; 150/167

(58) Field of Classification Search ................. 296/78.1, 296/136.01, 136.04, 136.05, 136.1, 136.13; 150/166, 167
See application file for complete search history.

(56) References Cited

U.S. PATENT DOCUMENTS

| | | | |
|---|---|---|---|
| 3,884,523 A * | 5/1975 | Allen | 296/136.04 |
| 4,283,084 A | 8/1981 | Gallagher | |
| 4,596,418 A * | 6/1986 | Koh | 296/136.04 |
| 5,188,417 A * | 2/1993 | Curchod | 296/136.04 |
| 5,282,502 A * | 2/1994 | Ballard | 150/167 |
| 5,328,230 A * | 7/1994 | Curchod | 296/136.04 |
| 5,364,155 A * | 11/1994 | Kuwahara et al. | 296/136.04 |
| 5,597,197 A * | 1/1997 | Mowar et al. | 296/136.04 |
| 5,795,009 A * | 8/1998 | Sack et al. | 296/78.1 |
| 5,921,389 A | 7/1999 | Zoffer | |
| 6,209,599 B1 | 4/2001 | Richardson | |
| 6,416,108 B1 | 7/2002 | Elswick | |
| 7,013,904 B2 | 3/2006 | Kofler | |
| 7,213,868 B1 * | 5/2007 | Tan | 296/136.04 |
| 7,757,734 B2 * | 7/2010 | Hooker et al. | 150/167 |
| 2003/0098108 A1 | 5/2003 | Littlefield | |

* cited by examiner

*Primary Examiner* — Lori Lyjak

(74) *Attorney, Agent, or Firm* — Bateman IP; Brett Peterson

(57) ABSTRACT

A recreational vehicle cover is provided which is compact and easy to use. The cover has an attached storage pouch, and remains attached to the vehicle during use.

19 Claims, 6 Drawing Sheets

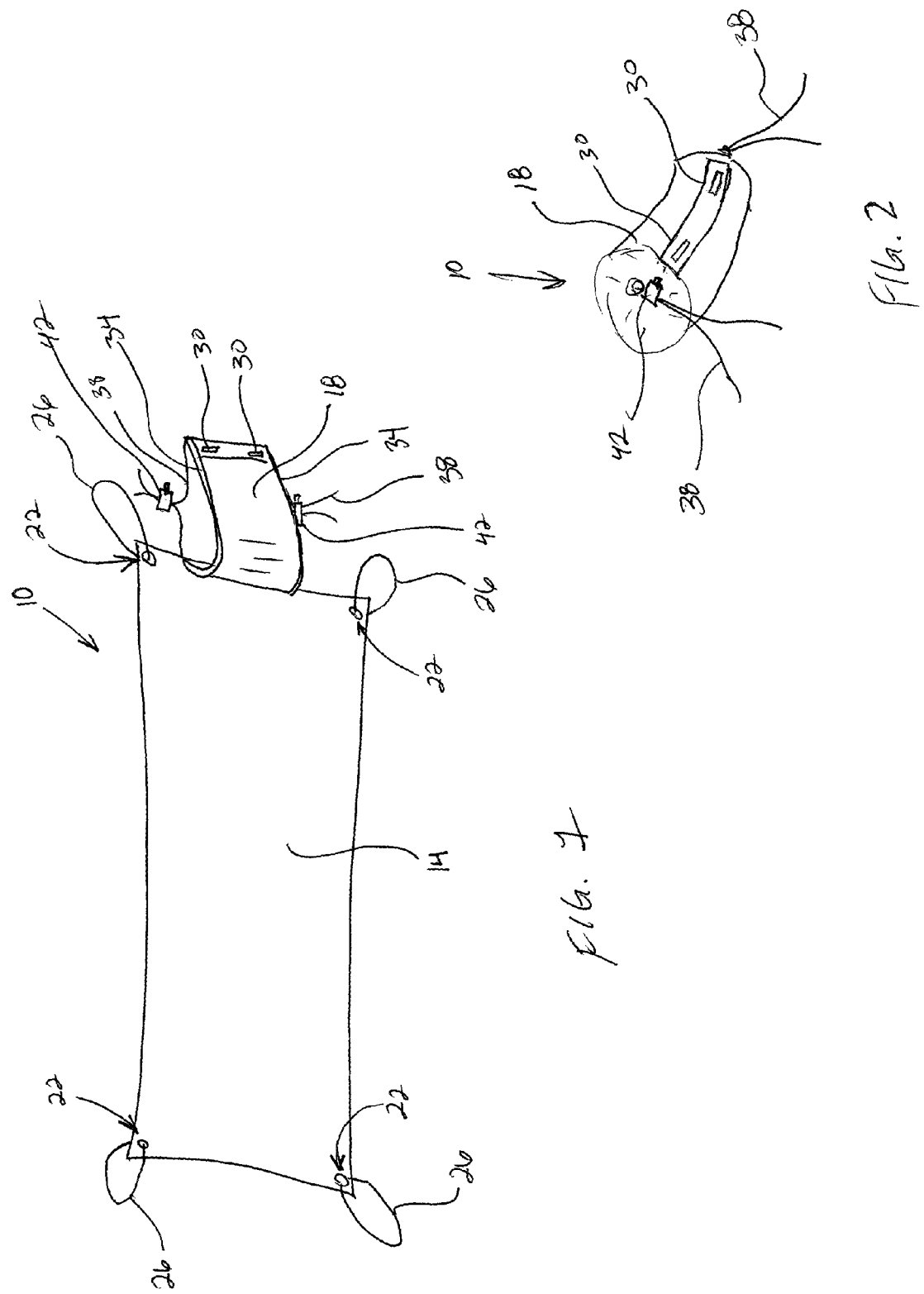

RECREATIONAL VEHICLE COVER

PRIORITY

The present application claims the benefit of U.S. Provisional Application Ser. No. 61/284,505, filed Dec. 17, 2009, which is herein incorporated by reference in its entirety.

THE FIELD OF THE INVENTION

The present invention relates to recreational vehicle covers. More specifically, the present invention relates to a recreational vehicle cover which fits a variety of vehicles and is compact enough to be stored on the vehicle.

BACKGROUND

Recreational vehicles, including motorcycles, bicycles and the like, are often used for transportation as well as for entertainment. These vehicles are often exposed to the elements and the open nature of recreational vehicles causes them to suffer from wear and deterioration not typically found on enclosed vehicles such as automobiles. When parked, for example, the handle bars, gauges and switches of recreational vehicles are exposed to the sun and to the weather.

Many persons have made recreational vehicle covers in an attempt to protect these vehicles. These covers, however, are typically directed towards long term storage and are not well suited for daily use. The covers are usually bulky and time consuming to use. There is a need for a recreational vehicle cover which is suited for daily use.

SUMMARY OF THE INVENTION

It is an object of the present invention to provide an improved recreational vehicle cover.

According to one aspect of the invention, a cover is provided which is compact, easily portable, and convenient to use. The cover is designed such that it may be rolled or folded into a compact size. The cover is quickly deployed from a storage position, allowing a person to easily cover a recreational vehicle between periods of use. The cover is typically attached to the handlebars of the vehicle. The compact storage size of the cover allows it to be placed on the handlebars without interfering with the use of the vehicle. The cover design allows the cover to be deployed onto the vehicle without removing the cover from the handlebars. Because the cover can be carried on the vehicle and easily deployed, the cover may be conveniently used for short periods of time between uses of the recreational vehicle. The cover protects the more sensitive vehicle components such as the seat, fuel tank, gauges and switches.

These and other aspects of the present invention are realized in a recreational vehicle cover as shown and described in the following figures and related description.

BRIEF DESCRIPTION OF THE DRAWINGS

Various embodiments of the present invention are shown and described in reference to the numbered drawings wherein:

FIG. 1 shows a perspective view of a vehicle cover of the present invention;

FIG. 2 shows another perspective view of the cover of FIG. 1;

Figure 3:
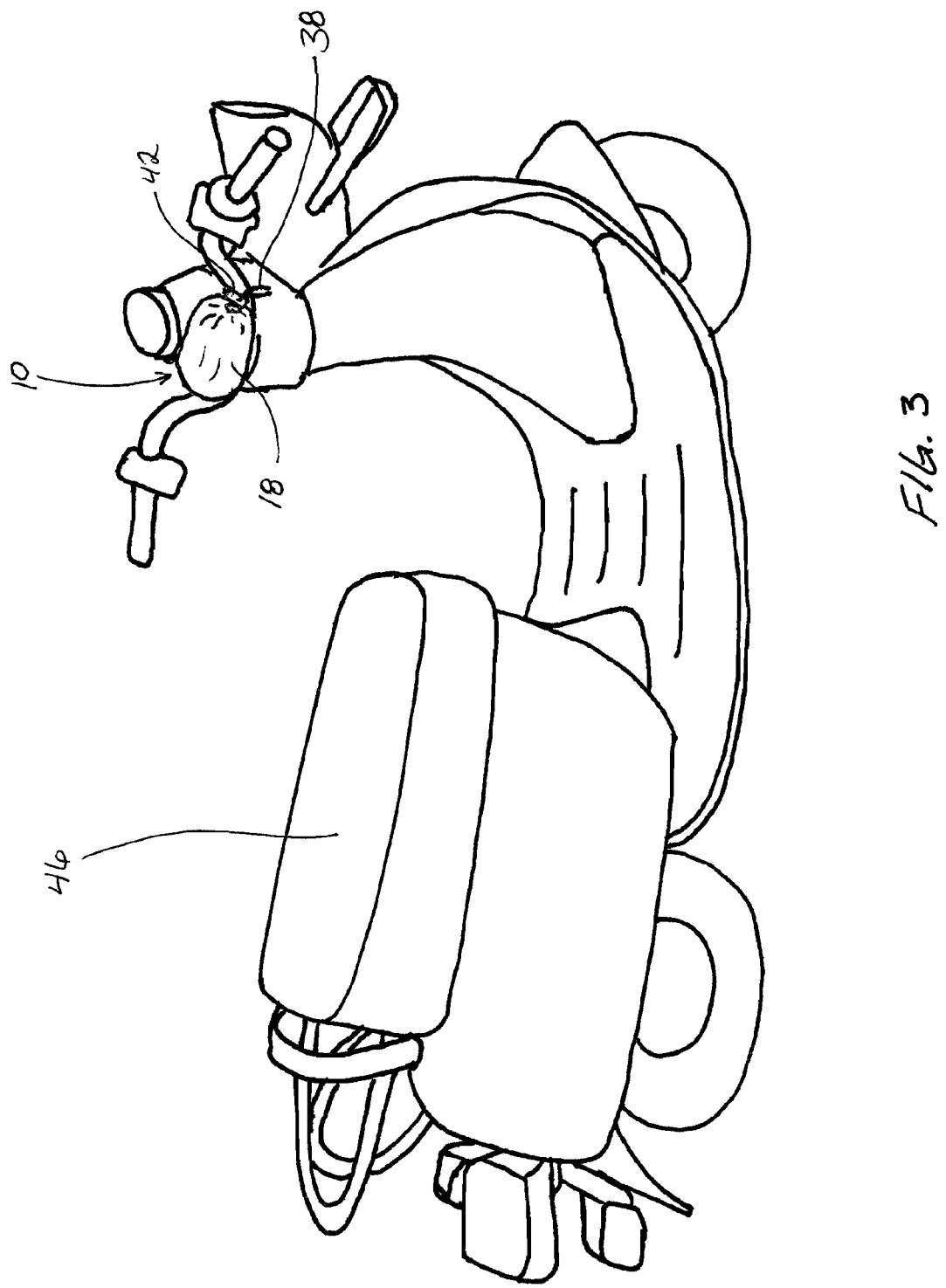
FIGS. 3 and 4 show the cover of FIG. 1 installed on a vehicle.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Turning now to FIG. 1, a perspective view of a recreational vehicle cover 10 according to the present invention is shown. The cover 10 includes a rear cover portion 14 which extends rearwardly from an integral storage pouch 18. The rear cover 14 is generally rectangular in shape, and may have eyelets 22 formed at the corners. Attachment anchors 26 are attached to the eyelets 22 and used to secure the rear cover 14 to a vehicle. Preferably, the attachment anchors 26 are elastic cords or elastic loops (as shown), and may include a small cleat or pinch release cord lock to adjust the size of the anchor. The rear cover 14 is typically made of a light material such as a rip-stop nylon.

The rear edge of the pouch 18 is attached to the front edge of the rear cover 14. The pouch 18 has connectors 30 on the front edge of the pouch. The connectors 30 are used to secure the pouch to vehicle handlebars. The sides of the pouch 18 are sewn into a tube 34 and have elastic drawstrings 38 which pass through the tubes. A pinch type cord lock 42 is used with the drawstrings 38 to draw the pouch 18 closed around the rear cover 14. FIG. 2 shows the cover 10 in a closed configuration. The cover 10 is designed such that it does not need to be removed from a vehicle during use or storage.

Figure 4:
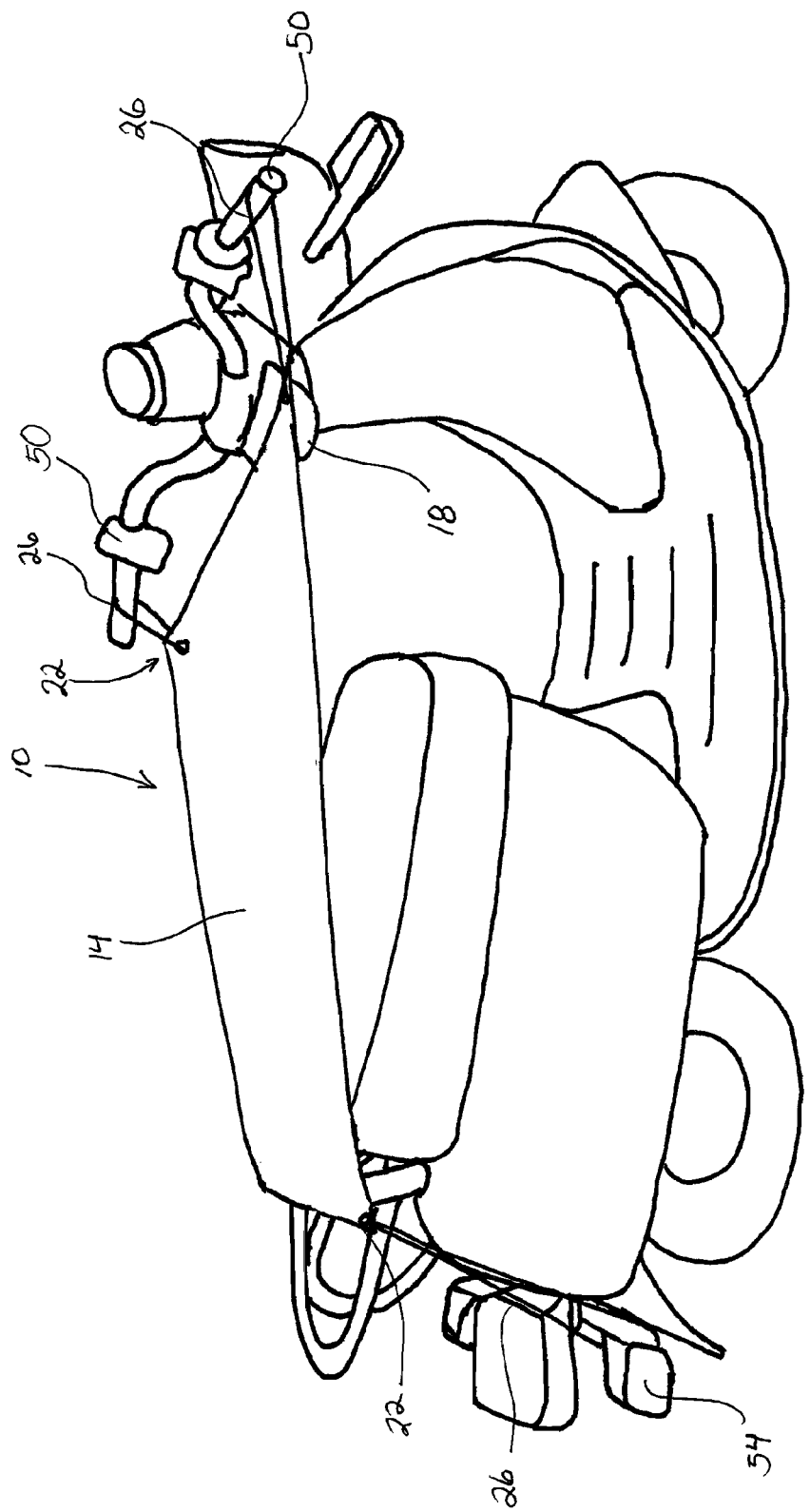

The connectors 30 are attached to the handlebars of a recreational vehicle such as a bicycle or the scooter 46 shown in FIG. 3. The connectors 30 may be hook and loop fastener strips, or may be elastic cords which pass through eyelets on the cover 18. The drawstrings 38 and cord locks 42 keep the rear cover 14 secured in the pouch 18. To deploy the cover 10, the drawstrings 38 are released, allowing the rear cover 14 to be removed from the pouch 18 and be stretched over the scooter 46, as shown in FIG. 4. The attachment anchors 26 are used to secure the corners of the rear cover 14 to the scooter 46, such as to the handlebars 50 or lights 54. In this position the cover 10 covers parts of the scooter such as the seat, gas tank, switches, etc. and protects these from the sun or rain.

The cover 10 may be stowed for use of the scooter 46 by removing the attachment anchors 26, folding or rolling the rear cover 14 into the pouch 18, and tightening the drawstrings 38. The cover 10 remains attached to the vehicle handlebars 50 via connectors 30. The cover 10 is advantageous as it can remain attached to the scooter for storage so that it is always with the scooter, and need not be detached for use. This convenience allows many persons who would forgo a conventional cover to use a cover to protect their vehicle.

Figure 5:
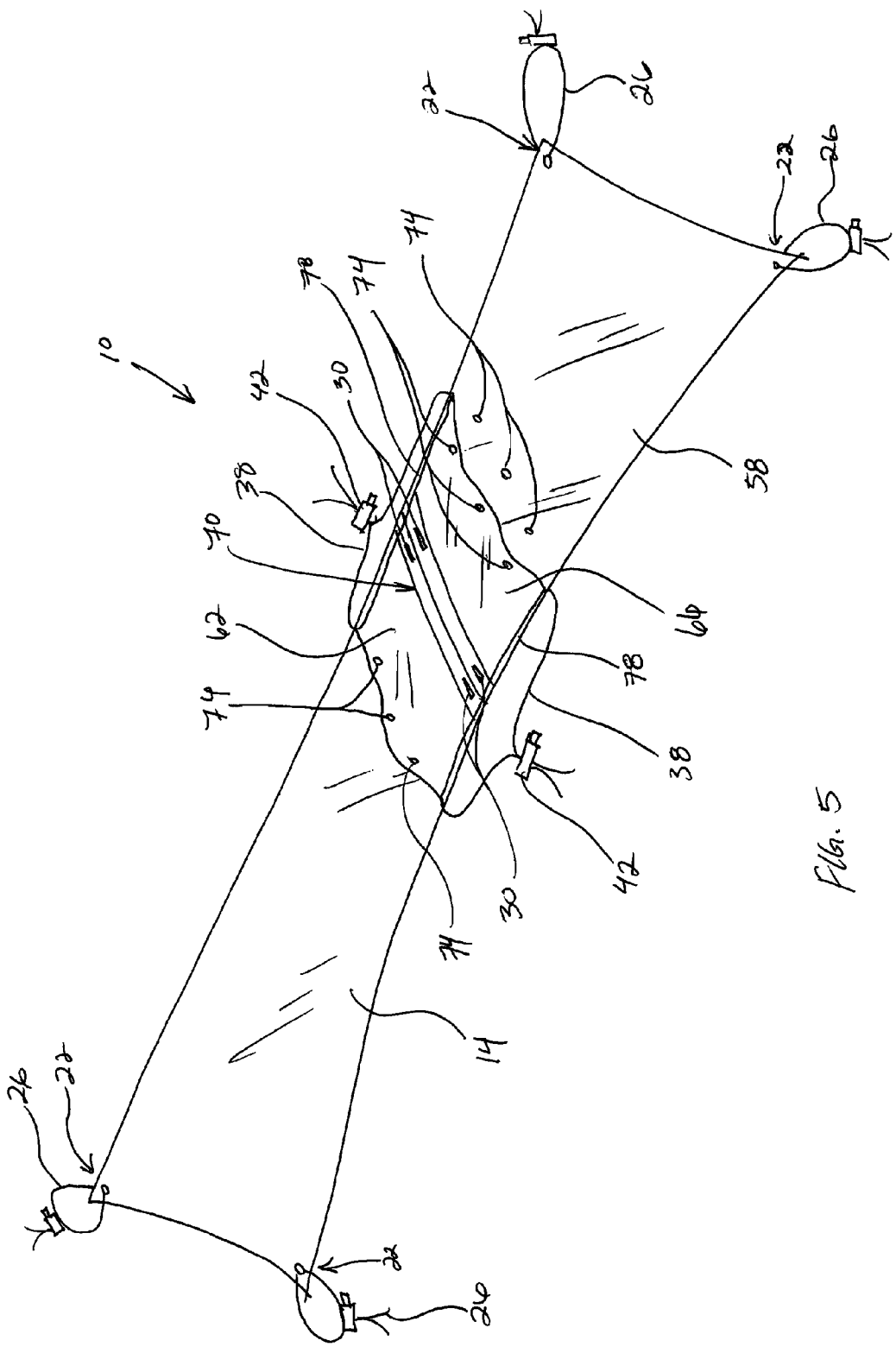
FIG. 5 shows a perspective view of another vehicle cover of the present invention.
Figure 7:
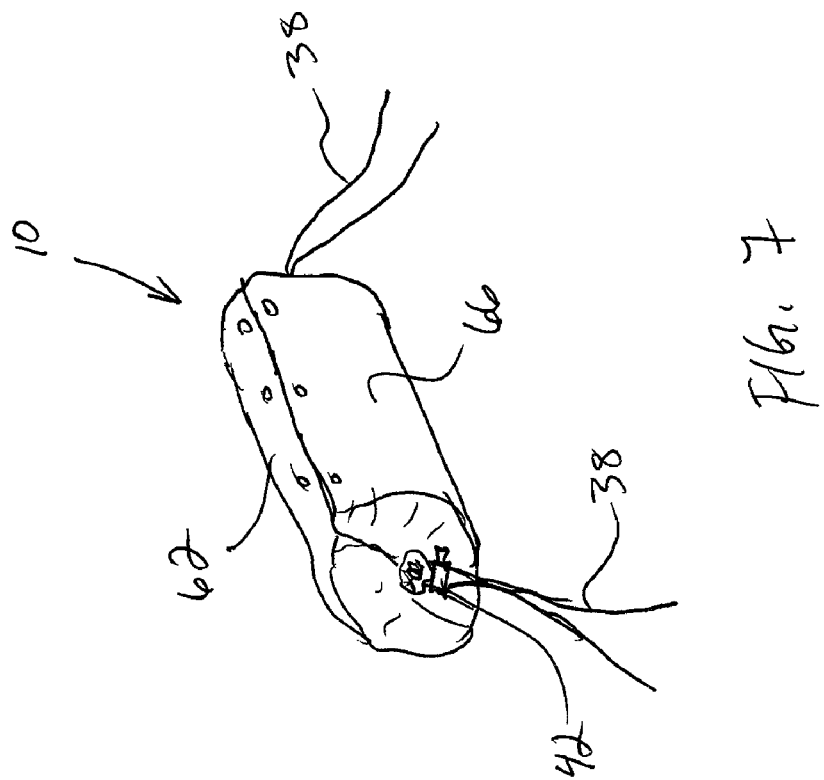
FIGS. 6 and 7 show additional perspective views of the cover of FIG. 5.

FIG. 5 shows a perspective view of another cover 10. The cover 10 also includes a rear cover portion 14 as well as a front cover portion 58. The rear cover 14 and front cover 58 are joined together adjacent connectors 30. Eyelets 22 and attachment anchors 26 are used at the corners of the rear cover 14 and front cover 58 as discussed previously. A rear pouch 62 and front pouch 66 are formed integrally with the rear cover 14 and front cover 58, with openings facing away from the central portion 70 adjacent connectors 30. Snaps 74 may be provided to close the pouches 62, 66. The edges 78 of the pouches 62, 66 are formed into a tube and have a drawstring 38 passing therethrough. A cord lock 42 is used with the drawstring 38 to close the pouches 62, 66 as shown in FIG. 7.

Figure 6:
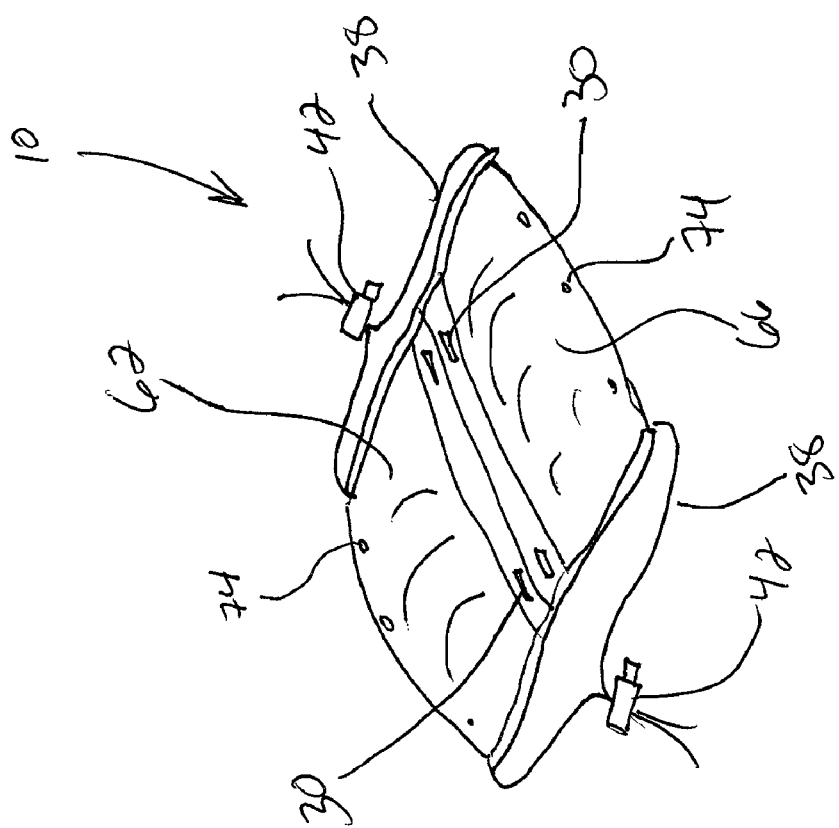

As shown in FIG. 6, the rear cover 14 is folded into the rear pouch 62 and the snaps 74 are used to close the pouch 62. Similarly, the front cover 58 is secured into the front pouch 66. The drawstrings 38 are then used to close the pouch together as shown in FIG. 7.

Figure 8:
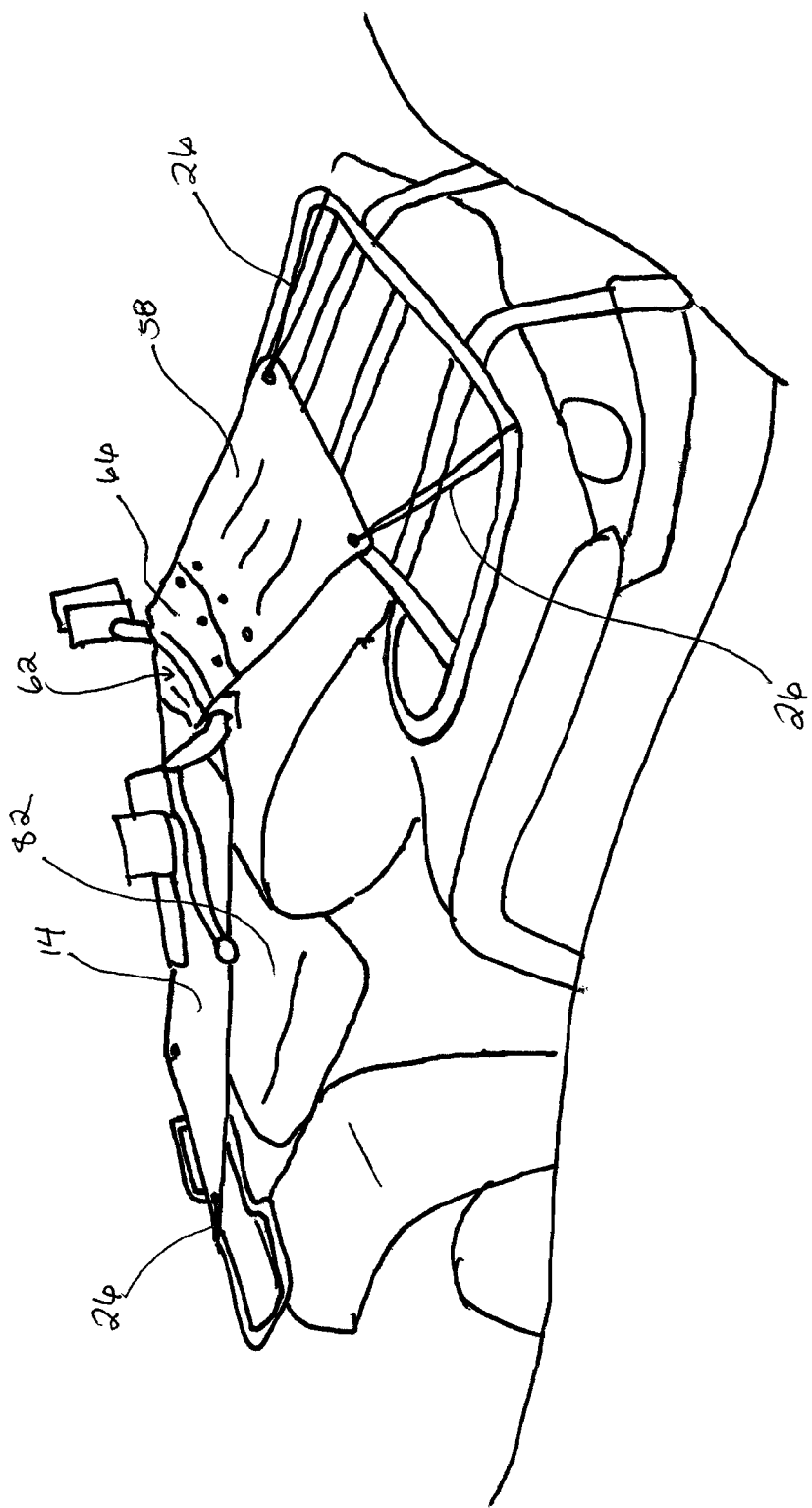
FIG. 8 shows a perspective view of the cover of FIG. 5 installed on a vehicle.

FIG. 8 shows the cover 10 installed on an ATV 82. The connectors 30 are attached to the ATV handlebars as discussed previously. The cover 10 is deployed by releasing the drawstrings 38 and snaps 74 and extending the rear cover 14 and front cover 58 over the vehicle as shown. The attachment anchors 26 are used to secure the cover to the front and back of the vehicle. The cover 10 protects the gas tank, seats, gauges and switches from the weather. The cover 10 may be stored as discussed relative to FIGS. 5 through 7 without releasing the connectors 30 from the vehicle. The cover 10 is thus advantageous as it remains attached to the vehicle while being compact enough to not interfere with operation of the vehicle. The cover is quick and easy to use, allowing persons to use a cover where prior art covers were too cumbersome. As such, the cover 10 is more usable, and more beneficial, to a consumer. The cover 10 is also advantageous as it provides some measure of theft deterrent. Simply covering a recreational vehicle to make small items such as accessories not visible will, in many cases, prevent the theft of those items. The cover 10 also forms a large surface when deployed, and provides a beneficial location for advertising print.

There is thus disclosed an improved cover for recreational vehicles. It will be appreciated that numerous changes may be made to the present invention without departing from the scope of the claims.

What is claimed is:

1. A recreational vehicle cover comprising:
   a cover disposable to cover portions of a recreational vehicle;
   attachment anchors attached to the cover and attachable to the recreational vehicle to dispose the cover of the vehicle;
   a storage pouch attached to the cover;
   connectors attached to the storage pouch for connecting the storage pouch to the vehicle; and
   wherein the cover is selectively storable in the storage pouch and deployable over the vehicle without disconnecting the storage pouch connectors from the vehicle; and
   wherein the cover comprises a rear cover section and a front cover section, and wherein the cover is attached to a vehicle between the rear cover section and the front cover section.

2. The cover of claim 1, wherein the connectors are attached to vehicle handlebars.

3. The cover of claim 1, wherein the cover is stored attached to the handlebars.

4. The cover of claim 1, wherein the cover comprises connectors between the rear cover section and the front cover section, the connectors being attachable to vehicle handlebars.

5. The cover of claim 4, wherein the cover comprises a rear storage pouch disposed adjacent the connectors and a front storage pouch disposed adjacent the connectors.

6. The cover of claim 5, wherein the rear storage pouch is formed as part of the rear cover section and the front storage pouch is formed as part of the front storage section.

7. The cover of claim 6, wherein the rear cover section is placed in the rear storage pouch, the front cover section is placed in the front storage pouch, and the front storage pouch and rear storage pouch are foldable together for storage.

8. The cover of claim 1, wherein the cover, when installed on a vehicle, extends from vehicle handlebars to the rear of the vehicle.

9. A cover for a recreational vehicle comprising:
   a storage pouch;
   connectors disposed on the storage pouch and, when installed on a vehicle, attached to handlebars of the vehicle;
   a cover attached to the storage pouch, the cover being extendable from the storage pouch to cover portions of the vehicle; and
   anchors disposed on the cover and attachable to the vehicle to secure the cover to the vehicle; and
   wherein the cover comprises a rear cover section extendable rearwards from the vehicle handlebars to cover the vehicle seat and a front cover section extendable forwards from the vehicle handlebars.

10. The cover of claim 9, wherein the cover is permanently attached to the storage pouch and the storage pouch remains attached to the vehicle when the cover is deployed and when the cover is stored in the storage pouch.

11. The cover of claim 9, wherein the storage pouch comprises a rear storage pouch and a front storage pouch, and wherein the connectors are disposed between the rear storage pouch and the front storage pouch.

12. The cover of claim 11, wherein the rear storage pouch is formed as part of the rear cover section and the front storage pouch is formed as part of the front cover section.

13. The cover of claim 9, wherein the cover is stored by placing the cover within the storage pouch and storing the cover on the vehicle handlebars.

14. A cover for a recreational vehicle comprising:
   a storage pouch;
   connectors disposed on the storage pouch and attached to a vehicle to secure the storage pouch to the vehicle;
   a cover attached to the storage pouch, the cover being extendable from the storage pouch to cover portions of the vehicle; and
   anchors disposed on the cover and attachable to the vehicle to secure the cover to the vehicle; and
   wherein the cover comprises a rear cover section extendable rearward from the storage pouch and a front cover section extendable forward from the storage pouch, and wherein the cover is attached to the vehicle between the rear cover section and the front cover section.

15. The cover of claim 14, wherein the cover is selectively storable in the storage pouch and deployable over the vehicle without disconnecting the storage pouch connectors from the vehicle.

16. The cover of claim 14, wherein the cover is stored attached to vehicle handlebars.

17. The cover of claim 14, wherein the storage pouch comprises a rear storage pouch section and a front storage pouch section disposed adjacent the rear storage pouch section.

18. The cover of claim 17, wherein the rear storage pouch section is formed as part of the rear cover section and the front storage pouch section is formed as part of the front storage section.

19. The cover of claim 18, wherein the rear cover section is placed in the rear storage pouch section, the front cover section is placed in the front storage pouch section, and the front storage pouch section and rear storage pouch section are foldable together for storage.

* * * * *